INVENTORS.
ELMER H. GREENBERG
WILLIAM B. GREENBERG
BY
ATTORNEY.

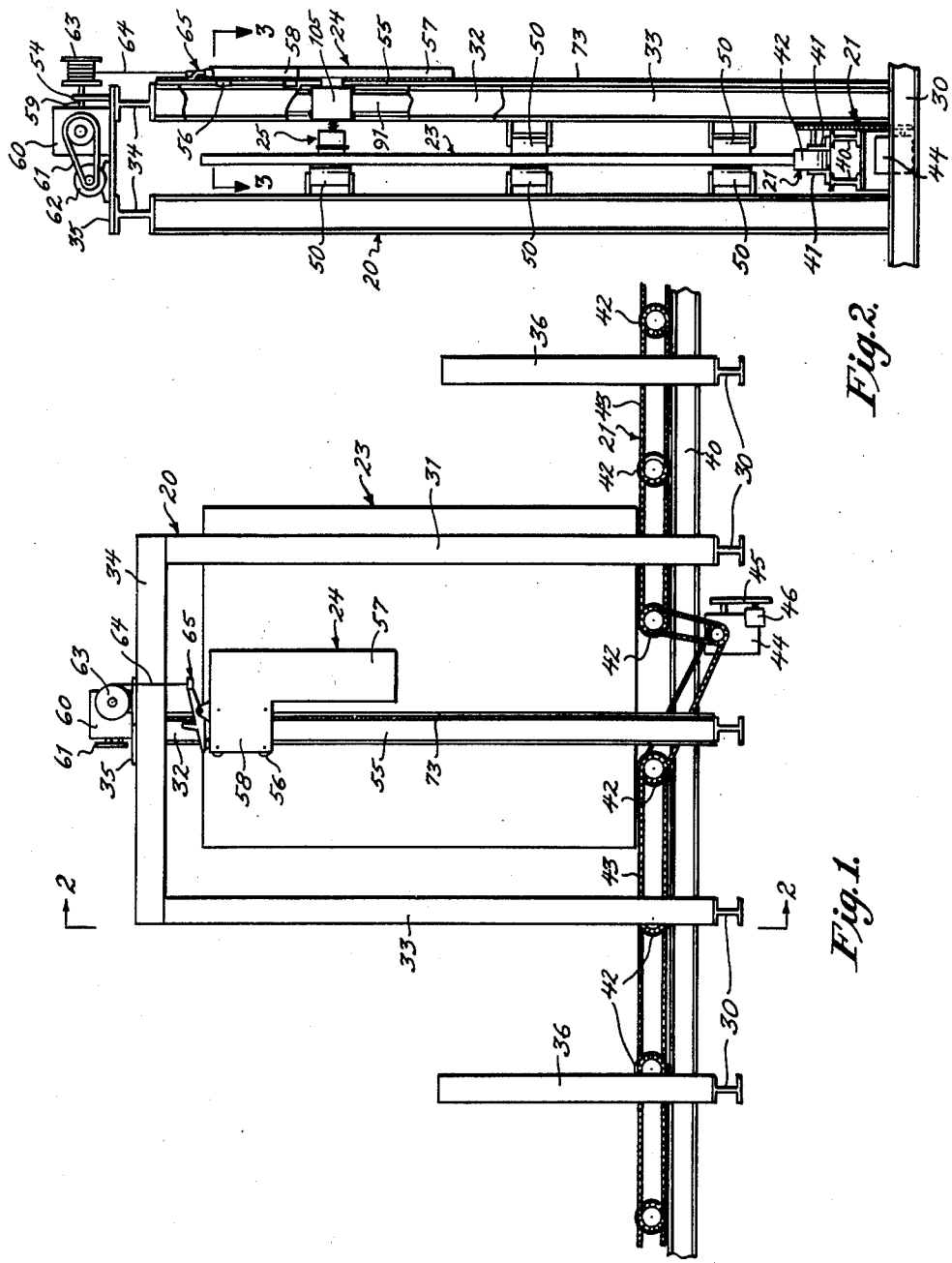

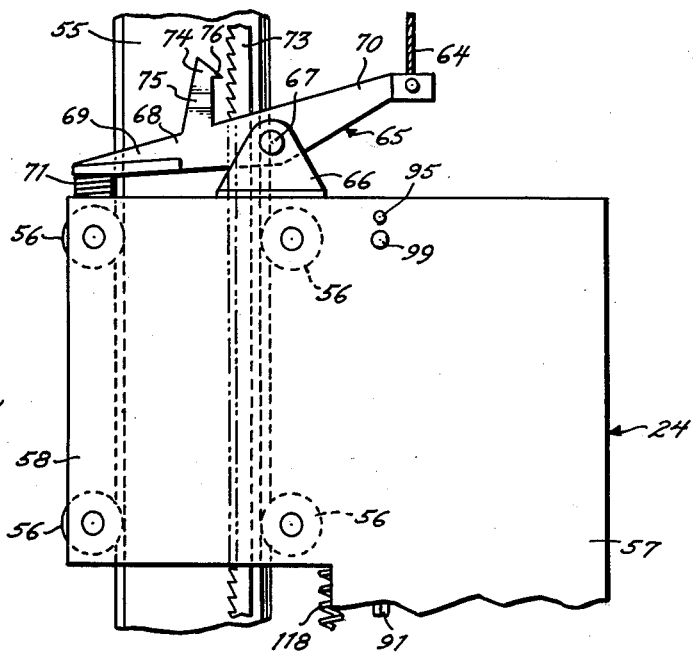
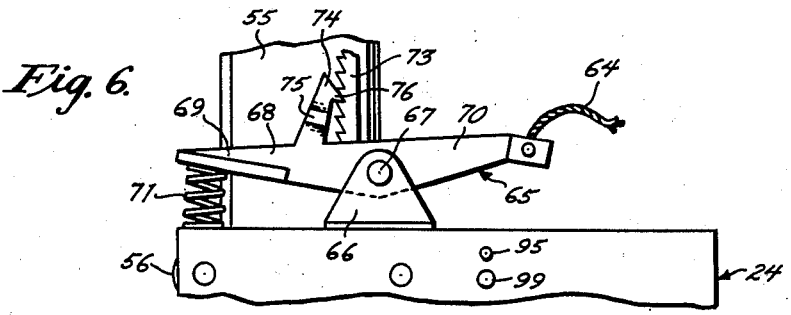
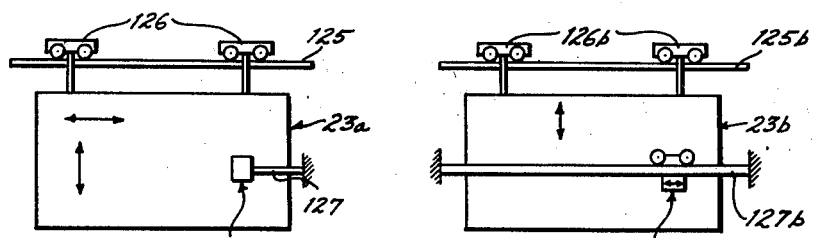

United States Patent Office 3,188,859
Patented June 15, 1965

3,188,859
APPARATUS FOR SCANNING TEST HEADS OVER LARGE OBJECTS
Elmer H. Greenberg, 2500 Belmont Ave., Philadelphia 31, Pa., and William B. Greenberg, 1510 Brinton Park Drive, Wynnewood, Pa.
Filed July 5, 1961, Ser. No. 121,921
6 Claims. (Cl. 73—71.5)

This invention relates generally to testing apparatus, being especially concerned with the testing of relatively large objects, and constitutes an apparatus for use in conjunction with that of our copending application filed July 20, 1959, Serial Number 828,141, now Patent No. 3,055,150, and that filed September 6, 1960, Serial Number 54,167, now Patent No. 3,103,767.

While the present invention is illustrated and described hereinafter in the testing of large metal plates, it is understood that the invention is not so limited, but capable of many varied applications, all of which are intended to be comprehended herein.

As one object of the present invention there is provided an apparatus for testing large metal plates throughout the full surface thereof, or over grid patterns of infinite variation, so as to afford great versatility of testing procedures.

It is a particular object of the present invention to provide a testing apparatus of the type described which includes both linear testing or scanning, and spot testing, as at regularly spaced intervals, say for the respective detection of flaws and thickness variations.

It is still another object of the present invention to provide testing apparatus having the advantageous characteristics mentioned in the preceding paragraph which is extremely simple in construction, highly durable and entirely reliable in operation, and which can be manufactured, installed and maintained at reasonable cost.

It is still a further object of the present invention to provide an apparatus for testing large metal plates which is thorough, rapid and economical, and which is adapted for continuous-production-line use.

Other objects of the present invention will become apparent upon reading the following specification and referring to the accompanying drawings, which form a material part of this disclosure. The invention accordingly consists in the features of construction, and combinations and arrangements of parts and method steps, which will be exemplified in the following description, and of which the scope will be indicated by the appended claims.

In the drawings:

FIGURE 1 is a longitudinal elevational view showing apparatus constructed in accordance with the teachings of the present invention;

FIGURE 2 is a transverse sectional elevational view taken substantially along the line 2—2 of FIGURE 1;

FIGURE 5 is a partial elevational view taken substantially along the line 5—5 of FIGURE 4 and illustrating normal condition of operation;

FIGURE 6 is a partial elevational view similar to FIGURE 5, but illustrating operation upon failure; and FIGURES 7 and 8 are somewhat diagrammatic representations illustrating various structural embodiments and modes of operation in accordance with the teachings of the present invention.

Figures 3, 4:
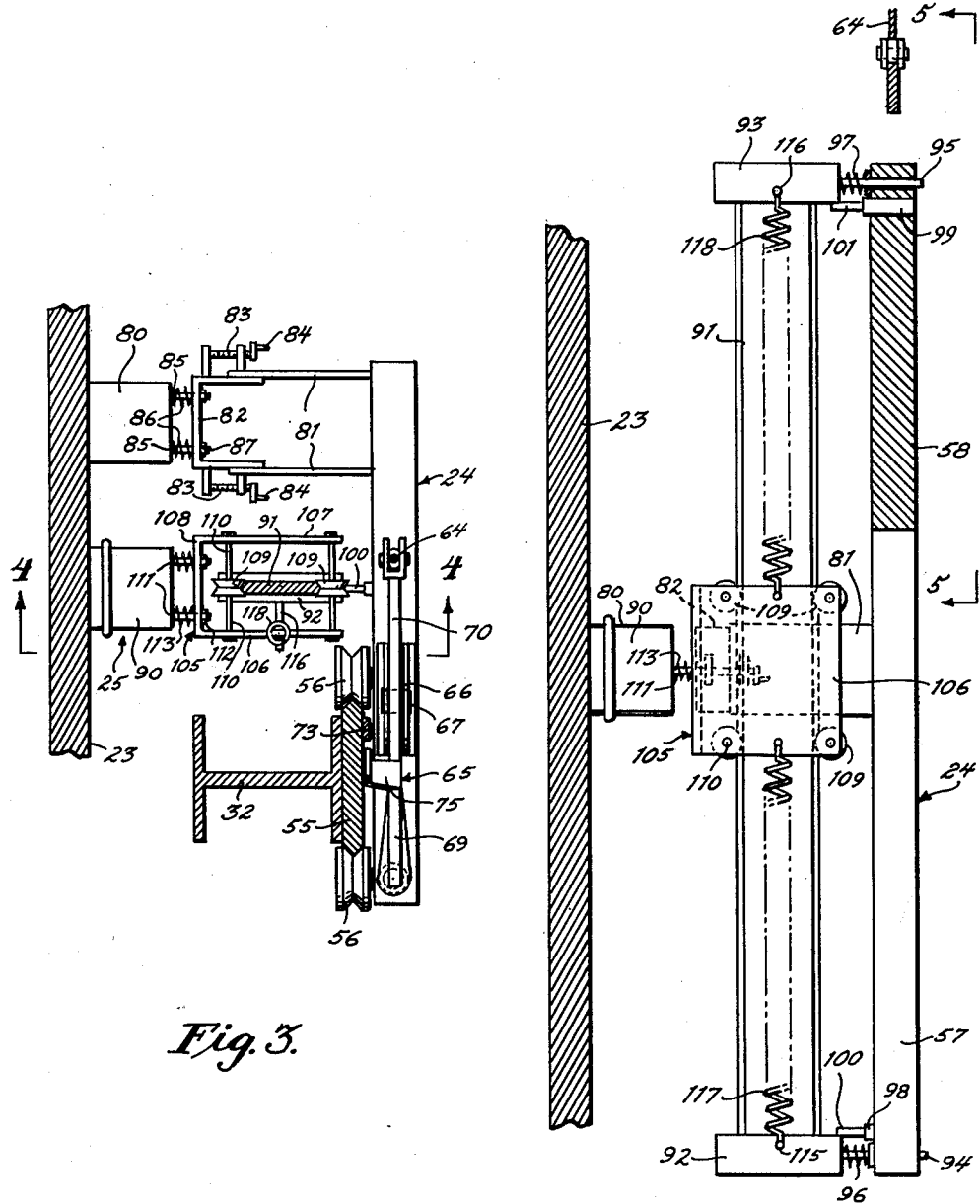
FIGURE 3 is a partial horizontal sectional view taken substantially along the line 3—3 of FIGURE 2, somewhat enlarged for clarity.
FIGURE 4 is a sectional elevational view taken substantially along the line 4—4 of FIGURE 3.

Referring now more particularly to the drawings, and specifically to FIGURES 1 and 2 thereof, a frame is generally designated 20, within which is located suitable conveyor means 21 for handling an article to be treated. The frame 20 and conveyor 21 constitute support means for supporting an upstanding article or plate 23 in position to be treated, and moving the plate as required. A carriage, generally designated 24 is mounted for movement relative to the upstanding plate or workpiece 23, as along one face thereof, and carries testing means, generally designated 25 in testing relation with the workpiece.

More particularly, in FIGURE 2 it will be observed that the frame 20 is generally symmetrical about the conveyor 21 and the workpiece or plate 23; and, that there is provided the testing means 25 on one side of the workpiece for movement along one face thereof. The testing means 25 may be of the ultrasonic type and operate by reflection or through transmission, as desired. In the latter case, ultrasonic receiving heads would be provided opposite the transmission heads on the other side of the plate.

The frame 20 includes a plurality of parallel spaced, crosswise base members 30, which may be embedded in or otherwise fixedly secured to an appropriate ground or other supporting surface. On each side of the conveyor 21, extending generally upward from a plurality of adjacent base members 30, are a plurality of uprights 31, 32 and 33. The uprights 31, 32 and 33 on each side of the conveyor 21 are in alignment with each other longitudinally of the conveyor, while the uprights 31 on opposite sides of the conveyor are in alignment with each other transversely of the conveyor. Similarly, the uprights 32 are in alignment with each other transversely of the conveyor, as are the uprights 33. Extending across the upper ends of the uprights 31, 32 and 33, on each side of the conveyor 21, is a top frame member or lintel 34. The lintels 34 on opposite sides of the conveyor 21 may be connected together by a transverse mounting plate 35 bridging the space between the top members. Additional uprights 36 may be fixed at their lower ends to additional base members 30 on both sides of the conveyor 21. All of the frame members 30, 31, 32, 33, 34 and 36 may be formed of structural I beams or other suitable beam members, as desired. The frame members, as well as the mounting plate 35, may all be fixedly secured to each other in the above-described arrangement, as by welding or other suitable fastening means.

The conveyor means 21 includes a pair of longitudinally extending, laterally spaced, generally horizontal support members 40 fixedly secured by any suitable means between the uprights 31, 32, 33 and 36. At longitudinally spaced locations along the support beams 40 are provided pairs of upstanding journal pedestals 41, each pair of journal pedestals carrying therebetween a rotatable roller 42. Thus, a plurality of rollers 42 are arranged in longitudinally spaced relation between the uprights of frame 20, each being journaled for rotation about a horizontally disposed axis extending transversely of the conveyor means 21. Suitable drive means in the form of sprocket-and-chain connections 43 may connect the various rollers 42 to each other, and to a variable-speed transmission 44 for simultaneous rotation of the rollers. The variable-speed transmission 44 may be connected through any transmission means 45 to a suitable drive means or motor 46, so that the latter effects simultaneous and equal angular velocities of all the rollers 42 for conveyance thereby of the workpiece or plate 23 resting on edge on at least two of the conveyor rollers.

In order to maintain the workpiece or plate 23 in its upright condition while resting edgewise on and being conveyed by the rollers 42, the uprights 31, 32, 33 and 36 may each be provided with one or more guide rollers 50 on their inner or facing sides for rolling engagement with a workpiece being conveyed therebetween, see FIGURE 2. The guide rollers 50 may be adjustable toward and away from each other to properly locate plates of varying thickness.

As best seen in FIGURES 1, 2 and 3, one upright 32 is provided on its outer flange with a vertically extending plate or rail 55 which may have its vertical edges configured for engagement with wheels 56 of the carriage 24. That is, the rail 55 may consist of a vertically elongate plate fixedly secured by any suitable means in facing engagement with the outer flange of the upright member or column 32, and having its vertical edges extending beyond the supporting flange. The carriage 24 may consist of a generally vertically disposed plate of inverted L-shape configuration having a vertically elongate upright region 57 and a lateral extension 58 at its upper end. The extension portion 48 is disposed laterally outward of and facing toward the rail 55, while the vertical portion 57 depends along one edge of the rail. The mounting wheels or rollers 56 are carried by the portion 58.

In FIGURE 1 it may be observed that the mounting plate 35 on the top members 34 is substantially directly above the uprights or columns 32 which carry the carriage 24. Mounted on the upper surface of the plate 35, substantially directly over the right-hand top member 34 as seen in FIGURE 2, is an upstanding journal bearing 54 which journals a transversely extending, horizontal shaft 59. The shaft 59 is connected on its laterally inward end through a transmission 60, also mounted on the plate 35, and a belt 61, or other suitable transmission means, to a motor or variable-speed drive element 62, which is also mounted on the plate 35. Thus, the motor 62, through the transmission means 60 and 61, effects axial rotation of the shaft 59. The motor 62 is of a reversible character to effect rotation of shaft 59 in opposite directions.

On the laterally outward, overhanging end of shaft 59 is carried a drum or winch 63, about which is coiled a cable 64. One end of the cable 64 depends toward the carriage 24 for connection to the latter through a safety catch, generally designated 65.

As best seen in FIGURE 5, the safety catch 65 is mounted on the upper edge of the carriage 24 by an upstanding journal pedestal 66 fixed to and projecting upward from the carriage. The pedestal 66 includes a laterally extending, generally horizontal pivot or pin 67; and, a lever 68 is mounted intermediate its ends on the pivot 67 for swinging movement about the latter. The lever 68 includes an arm 69 extending leftward, as seen in FIGURE 5, and an arm 70 extending rightward. The lever 68 is resiliently urged clockwise by suitable resilient means, such as a coil compression spring 71 interposed between the carriage portion 58 and the underside of arm 69. The depending end of the cable or suspension element 64 is connected to the distal end of lever arm 70; and, the weight of the carriage 24 is suspended through the catch mechanism 65 by the cable 64. Therefore, the cable 64 tends to turn the lever 68 counterclockwise against the force of compression spring 61 to maintain the lever in the position of FIGURE 5 during normal operation.

A vertically disposed toothed rack 73 extends along the outer side of and is fixed to the rail 55, being interposed between the latter and the carriage portion 58. The rack 73 may be fixed to the rail by any suitable means. Formed on the lever 68 of safety catch 65 is a pawl 74, which may upstand from the arm 69 spaced inward of the distal arm end. The outer or upper end of the pawl 74 is offset toward the rail 55, as by the angulate portion 75, and includes a tooth 76 substantially coplanar with and facing toward the teeth of rack 73. Upon clockwise rotation of the lever 68, the tooth 76 of pawl 74 will positively engage with an adjacent tooth of the rack 73 to prevent downward movement of the carriage 24. This condition would occur upon breaking or failure of the suspension element 64, whereupon the spring 71 rotates the catch 65 clockwise, as illustrated in FIGURE 6. Of course, this prevents falling of the carriage 24 and any damage resulting therefrom.

Carried by the vertical portion 57 of the carriage 24, on the face thereof toward the work 23, is a line-test unit 80 of the test means generally designated 25. The line-test unit may be an ultrasonic transducer for locating internal defects in the workpiece 23 during movement of the transducer along a face of the workpiece. One such line-testing or scanning transducer is the type disclosed in our copending patent application Serial No. 120,849 filed May 31, 1961. The transducer 80 is mounted on the carriage 24 for adjustment toward and away from the workpiece 23, as by a pair of brackets 81 fixed to the carriage and outstanding therefrom toward the workpiece. A generally U-shaped member or yoke 82 may have its legs extending respectively along the brackets 81 and mounted thereon for horizontal sliding movement toward and away from the plate 23, by any suitable mounting means. The yoke 82 is adjustably positionable along the brackets 81 by threaded adjustment members 83 having manually actuable cranks 84, or other suitable adjustment means. The transducer 80 is carried by the bight region of the yoke 82, a pair of pins 85 extending from the transducer slidably through the yoke and carrying springs 86 interposed between the yoke and transducer to urge the latter away from the carriage toward the workpiece. Suitable stop members or nuts 87 may be provided on the pins 85 to limit movement of the transducer 80 under the influence of spring 86. Suitable electrical and fluid-connection means may be provided for the line-testing transducer 80.

The testing means 25 also includes a spot-testing transducer 90, which may be of the ultrasonic type disclosed in our copending patent application Serial No. 120,849 filed May 31, 1961, say for detecting thickness variations of the workpiece. Thus, readings of the transducer 80 may be taken during movement of the latter to constitute line testing, while readings of the transducer 90 are taken when the latter is fixed relative to the workpiece 23, for spot testing.

The spot-testing transducer 90 is mounted on the carriage 24 for movement vertically relative to the carriage, and for movement horizontally toward and away from the carriage. The structure so mounting the spot-testing transducer includes a vertically disposed track 91 extending along the vertical carriage portion 57 on the side thereof toward the workpiece 23, and having lower and upper blocks or heads 92 and 93 at its upper ends. The track 91 is mounted on the carriage 24 by means of horizontal pins 94 and 95 extending rigidly from the heads 92 and 93, respectively, slidably through the carriage portion 57. Thus, the track 91 is movable horizontally toward and away from the carriage 24; and, coil springs 96 and 97 are respectively circumposed about the lower and upper pins or rods 94 and 95, being interposed between the carriage and the respective adjacent track head for resiliently urging the track toward the carriage and away from the workpiece. Thus, the resilient means or springs 96 and 97 may be of the tension type. Movement of the track 91 toward and away from the carriage 24 may be controlled by lower and upper solenoids 98 and 99 fixed to the carriage 24 and having their respective cores 100 and 101 connected to the lower and upper track end heads 92 and 93. Thus, movement of the track 91 away from the carriage 24 is effected by energization of the solenoids 98 and 99 to extend the cores 100 and 101 against the force of tension springs 96 and 97, while retraction of the track 91 may be effected by deenergization of the solenoids to permit return of the track under the force of the tension springs.

Mounted on the track 91 for movement vertically therealong is a subcarriage 105. The subcarriage 105 may be formed of a plate bent to a generally U-shaped configuration having side walls 106 and 107 on opposite sides of the track 91, and having a medial or connecting wall 108 extending between the side walls and located between the track 91 and the workpiece 23. A plurality of rollers or wheels 109 are arranged in generally rectangular configuration between the subcarriage side walls 106 and 107, each being mounted in the latter by a horizontally extending shaft 110, and in rolling engagement with the track 91 to mount the subcarriage for vertical movement along the track.

The spot-testing transducer 90 may be provided with pins or rods 111 projecting therefrom slidably through the subcarriage wall 108 to mount the transducer on the subcarriage for movement generally horizontally toward and away from the latter. Stop members or nuts 112 may be provided on the pins 111 to limit movement of transducer 90 away from the subcarriage 105, and coil compression springs 113 may be circumposed about the pins 111 in bearing engagement with the transducer 90 and wall 108 to urge the transducer away from the subcarriage.

The lower and upper track end blocks 92 and 93 are respectively provided with outstanding pins 115 and 116 for respective connection of tension springs 117 and 118 between the blocks and the subcarriage 105. That is, the tension spring 117 extends vertically between and has its opposite ends connected to the lower track block 92 and its upper end connected to the subcarriage 105, while the tension spring 118 extends vertically between and has its upper end connected to the upper track end block 93 and its lower end connected to the subcarriage. The springs 117 and 118 therefore resiliently urge the subcarriage vertically in opposite directions and tend to maintain the subcarriage medially of the track 91. However, the subcarriage 105 may be moved vertically in either direction along the track against the force of one spring and aided by the force of the other spring.

Suitable electrical and fluid connections may be provided for the spot-testing transducer 90, as well as electrical connections provided for the solenoids 98 and 99.

In operation, electrical controls may be provided of the type disclosed in our copending patent applications filed May 31, 1961, Serial No. 120,849; and filed July 20, 1959, Serial No. 828,141 now Patent No. 3,055,150.

Under such controls, the work-supporting conveyor 21 effects movement of the plate 23 horizontally in steps, and the carriage 24 is reciprocated vertically substantially the height of the work or plate by winding and unwinding operation of the drum 63. The operational sequence may be as follows:

(1) A single horizontal-step movement of the plate 23 leftward as seen in FIGURE 1 (during which the testing means may be inactive);

(2) A complete vertically downward motion of the carriage 24 (during which the testing means are in operation);

(3) An additional leftward step of the plate 23 (with the testing means inactive); and (4) Upward vertical movement of the carriage 24 the entire height of the plate (with the testing means operative).

It will thus be appreciated that the testing proceeds in vertical strips along the plate, and the strips may be spaced as desired, according to the length of horizontal-step movement of the plate. Of course, the plate may be completely tested by step movement equal to the width of a strip. Further, the testing means may remain operative during horizontal plate movement, if desired. Also, various combinations and modifications of the above-described operational procedure may be employed where circumstances require.

In the above-described operational sequence, the line-testing transducer 80 moves vertically together with the carriage 24. However, the spot-testing transducer 90 tests only spaced locations or spots along the path of movement of the line-testing transducer. That is, although the carriage 24 may move continuously throughout a vertical path the height of the plate 23, the spot-testing transducer 90 may test several spaced locations or spots along the vertical path. This is accomplished by energizing the solenoids 98 and 99 to move the subcarriage toward the plate 23 so as to frictionally hold the transducer 90 immovably against the plate or otherwise, as by vacuum or magnetically. Thus, upon vertical movement of the carriage 24, the spot transducer 90 remains at a fixed location relative to the plate and in operative testing relation with such location on the plate. For example, see FIGURE 4, upon downward movement of the carriage 24 with the transducer 90 in testing relation with the plate 23, the track 91 would move downward relative to the subcarriage 105, serving to extend the spring 117 and permitting contraction of the spring 118. In proper timed relation, the solenoids 98 and 99 are deenergized, permitting return of the subcarriage 105 downward to the medial region of the track 91, whereupon the solenoids are again energized to frictionally hold the testing transducer 90 in testing relation with a lower fixed location of the plate. During upward movement of the carriage 24, the solenoids 98 and 99 operate in the same timed on-off sequence, but during the testing of a spot with the transducer 90 fixed relative to the spot, the spring 118 is extended and the spring 117 permitted to contract. Thus, the track 91 moves upward relative to the temporarily fixed transducer 90.

If desired, horizontal lines of testing may be formed on the plate 23 by reciprocating the latter horizontally substantially its entire horizontal dimension, and by moving the carriage 24 stepwise vertically, the carriage steps being interposed between plate movements in opposite directions. This horizontal-strip-testing formation may be combined with the vertical-strip-testing formation described above to provide an intersecting grid pattern of vertical and horizontal strips; and with the vertical carriage steps properly located, the strip intersections may substantially coincide with the spot- or thickness-tested locations. In the horizontal-strip testing the solenoids 98 and 99 are deenergized so that the spot- or thickness-testing transducer 90 is retracted and inoperative. This control of the transducer 90 during horizontal line testing, as well as that described above in vertical line testing may be achieved by the circuitry of said copending applications.

By this means, continuous line testing by transducer 80, and intermittent spot testing by transducer 90 may take place simultaneously during continuous movement of the carriage 24.

In the embodiment of FIGURE 7, there is shown a generally horizontal support or track 125 rollably carrying one or more hoists 126. From the hoists may be suspended a generally vertically disposed workpiece or plate 23a for horizontal and vertical movement of the plate in any desired manner. Testing means, generally designated 25a may be secured in fixed location by a support 127. By this construction, relative movement between the testing means 25a and the plate 23a is obtained entirely by movement of the plate in both the horizontal and vertical directions, while the testing means remains stationary.

The additional embodiment of FIGURE 8 illustrates generally horizontal support or track 125b supporting one or more hoists 126b which have suspended therebelow a generally vertically disposed workpiece or plate 23b. In the instant embodiment the hoists 126b are employed to impart only vertical movement to the plate 23b. An additional generally horizontal support or track 127b is fixed and rollably supports testing means 25b. That is, the testing means is mounted for horizontal movement throughout the horizontal length of the plate 23b, while the plate itself is movable vertically, so that any combination of relative horizontal and vertical movement between the testing means and a plate may be achieved. Of course, it is understood that the subcarriage 105 and its mounting structure for spot testing during continuous movement may be employed in either of the embodiments of FIGURES 7 and 8.

From the foregoing, it is seen that the present invention provides a method and apparatus which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Test apparatus comprising support means for supporting a plate in upstanding position to be tested, a carriage, means mounting said carriage alongside of said support means for movement relative to said plate along a face thereof, test means carried by said carriage for movement with the latter in testing relation with said plate, mounting means mounting said test means for movement relative to said carriage, said mounting means comprising a track extending longitudinally of carriage movement and mounted on said carriage for movement toward and away from said one plate face, a subcarriage carrying said testing means and mounted on said track for back-and-forth movement therealong, and means on said carriage for moving said track toward and away from said plate to releasably frictionally engage said test means firmly against said plate, whereby said test means is adapted to be held stationary against said plate during movement of said carriage.

2. Test apparatus according to claim 1, in combination with resilient means yieldably urging said subcarriage to a medial position on said track, whereby said carirage is movable in opposite directions with said subcarriage held stationary and adapted to return to said medial track position upon release of said subcarriage from said plate.

3. Test apparatus according to claim 1, in combination with means resiliently mounting said testing means on said subcarriage and urging said testing means toward said plate.

4. In testing apparatus, a carriage mounted for movement relative to an article to be tested, flaw-testing means mounted on said carriage for movement therewith to test along a line configuration on said article, a track extending longitudinal of carriage movement and mounted on said carriage for movement therewith, thickness-testing means mounted on said track for movement therealong, and holding means for fixing said thickness-testing means relative to said article during movement of said carriage for simultaneous line and spot testing, said track being mounted on said carriage for movement toward and away from an article being tested, and said holding means comprising means for moving said track toward said article to nonmagnetically clamp said thickness-testing means fast to said article while permitting reciprocatory movement of said carriage and track relative to said thickness-testing means and an article.

5. In testing apparatus, a carriage mounted for movement relative to an article to be tested, flaw-testing means mounted on said carriage for movement therewith to test along a line configuration on said article, a track extending longitudinal of carriage movement and mounted on said carriage for movement therewith, thickness-testing means mounted on said track for movement therealong, holding means for fixing said thickness-testing means relative to said article during movement of said carriage for simultaneous line and spot testing, and resilient means yieldably urging said thickness-testing means to a medial position on said track, whereby said carriage is movable in opposite directions with said thickness-testing means held stationary and adapted to return to said medial track position upon release of said thickness-testing means from engagement with an article being tested.

6. In a plate-testing apparatus, support means for supporting a plate in upstanding position, a carriage mounted alongside of said support means in facing relation with a face of a supported plate, motion means for effecting a reciprocatory scanning pattern of carriage movement generally parallel relative to a supported plate, flaw-testing means mounted on said carriage for movement therewith to test along the line of the scanning pattern, a track extending longitudinally of carriage movement and mounted on said carriage for movement therewith, thickness-testing means mounted on said track intermediate the ends thereof for movement therealong in opposite directions, releasable holding means for fixing said thickness-testing means relative to a supported plate during movement of said carriage for simultaneous line and spot testing in either direction of its reciprocatory movement, and means for returning said thickness-testing means to its intermediate position upon release of said holding means.

References Cited by the Examiner

UNITED STATES PATENTS

| | | | |
|---|---|---|---|
| 1,013,232 | 1/12 | Stine | 187—82 |
| 1,057,303 | 3/13 | Trepa | 187—82 |
| 1,058,154 | 4/13 | Collins | 187—82 |
| 2,645,938 | 7/53 | Billstein | 73—67.8 X |
| 2,678,559 | 5/54 | Drake | 73—67.8 |
| 2,862,384 | 12/58 | Renaut | 73—67.6 |
| 2,989,864 | 6/61 | Bamford | 73—67.8 |
| 3,077,107 | 2/63 | Henry | 73—67.8 |

FOREIGN PATENTS

| | | |
|---|---|---|
| 1,222,996 | 1/60 | France. |
| 865,573 | 4/61 | Great Britain. |

OTHER REFERENCES

Manthey et al.: German application 1,060,626, printed July 2, 1959, Kl. 42k.

RICHARD C. QUEISSER, *Primary Examiner.*

JOHN B. BEAUCHAMP, *Examiner.*